United States Patent
Cheung et al.

(10) Patent No.: US 9,565,317 B2
(45) Date of Patent: *Feb. 7, 2017

(54) METHOD AND SYSTEM FOR PROVIDING COMMUNICATION CONTROL FUNCTIONALITY AT A REMOTELY LOCATED SITE USING A DISTRIBUTED FEATURE ARCHITECTURE

(71) Applicant: AT&T Intellectual Property II, L.P., Atlanta, GA (US)

(72) Inventors: Eric Cheung, New York, NY (US); Mark Jeffrey Foladare, East Brunswick, NJ (US); Shelley B. Goldman, East Brunswick, NJ (US); James Christopher Ramming, Palo Alto, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,068

(22) Filed: Aug. 17, 2015

(65) Prior Publication Data

US 2015/0358462 A1 Dec. 10, 2015

Related U.S. Application Data

(63) Continuation of application No. 13/619,027, filed on Sep. 14, 2012, now Pat. No. 9,112,950, which is a continuation of application No. 12/501,936, filed on Jul. 13, 2009, now Pat. No. 8,295,208, which is a continuation of application No. 11/147,796, filed on (Continued)

(51) Int. Cl.
| | |
|---|---|
| H04M 7/00 | (2006.01) |
| H04M 3/42 | (2006.01) |
| H04M 3/533 | (2006.01) |
| H04M 3/58 | (2006.01) |
| H04L 12/46 | (2006.01) |
| H04M 3/51 | (2006.01) |
| H04M 7/12 | (2006.01) |

(52) U.S. Cl.
CPC ........ *H04M 7/0003* (2013.01); *H04L 12/4604* (2013.01); *H04M 3/42161* (2013.01); *H04M 3/42314* (2013.01); *H04M 3/5125* (2013.01); *H04M 3/53333* (2013.01); *H04M 3/58* (2013.01); *H04M 7/0033* (2013.01); *H04M 7/128* (2013.01); *H04M 7/1295* (2013.01); *H04M 3/4234* (2013.01)

(58) Field of Classification Search
USPC ..................................................... 379/88.17
See application file for complete search history.

(56) References Cited

U.S. PATENT DOCUMENTS

| | | |
|---|---|---|
| 5,384,771 A | 1/1995 | Isidoro et al. |
| 5,724,423 A | 3/1998 | Khello |
| | (Continued) | |

Primary Examiner — Amal Zenati

(57) ABSTRACT

A method for providing communication control functionality at a remotely located site using a distributed feature architecture which provides communication features and data records to an Enhanced Network User (ENU). The ENU connects to a Distributed Feature Network (DFN) in order to gain access to communications features contained in the DFN. Based on the type of communication requested, one or more feature boxes are created in order to implement the requested communication.

20 Claims, 5 Drawing Sheets

Related U.S. Application Data

Jun. 7, 2005, now Pat. No. 7,567,524, which is a continuation of application No. 09/694,880, filed on Oct. 24, 2000, now Pat. No. 6,907,012.

(56) References Cited

U.S. PATENT DOCUMENTS

| | | | |
|---|---|---|---|
| 5,737,403 A | 4/1998 | Zave | |
| 5,778,060 A | 7/1998 | Otto | |
| 5,864,615 A | 1/1999 | Dezonno | |
| 5,960,073 A | 9/1999 | Kikinis et al. | |
| 5,987,115 A | 11/1999 | Petrunka et al. | |
| 6,046,762 A | 4/2000 | Sonesh et al. | |
| 6,049,602 A * | 4/2000 | Foladare | H04M 3/5125 |
| | | | 370/352 |
| 6,091,808 A * | 7/2000 | Wood | H04L 12/6418 |
| | | | 370/352 |
| 6,122,364 A | 9/2000 | Petrunka et al. | |
| 6,160,796 A | 12/2000 | Zou | |
| 6,160,883 A | 12/2000 | Jackson et al. | |
| 6,404,878 B1 | 6/2002 | Jackson et al. | |
| 6,456,711 B1 | 9/2002 | Cheung et al. | |
| 6,614,783 B1 | 9/2003 | Sonesh et al. | |
| 6,650,747 B1 | 11/2003 | Bala et al. | |
| 6,654,459 B1 | 11/2003 | Bala et al. | |
| 6,668,286 B2 | 12/2003 | Bateman et al. | |
| 6,822,942 B1 | 11/2004 | Jackson et al. | |
| 6,826,275 B1 | 11/2004 | Jackson et al. | |
| 6,907,012 B1 | 6/2005 | Cheung et al. | |
| 7,251,254 B2 | 7/2007 | Bond et al. | |
| 7,567,524 B1 | 7/2009 | Cheung et al. | |
| 7,571,469 B2 | 8/2009 | Hamberg | |
| 8,295,208 B2 | 10/2012 | Cheung et al. | |
| 2002/0001300 A1 | 1/2002 | Miloslavsky et al. | |
| 2003/0145054 A1 | 7/2003 | Dyke | |
| 2007/0184860 A1 | 8/2007 | Jansson | |
| 2007/0268930 A1 | 11/2007 | Bond et al. | |
| 2008/0144525 A1 | 6/2008 | Crockett et al. | |
| 2008/0222174 A1 | 9/2008 | Lyman | |

* cited by examiner

METHOD AND SYSTEM FOR PROVIDING COMMUNICATION CONTROL FUNCTIONALITY AT A REMOTELY LOCATED SITE USING A DISTRIBUTED FEATURE ARCHITECTURE This application is a continuation of U.S. patent application Ser. No. 13/619,027, filed Sep. 14, 2012, now U.S. Pat. No. 9,112,950, which is a continuation of U.S. patent application Ser. No. 12/501,936, filed Jul. 13, 2009, now U.S. Pat. No. 8,295,208, which is a continuation of U.S. patent application Ser. No. 11/147,796, filed Jun. 7, 2005, now U.S. Pat. No. 7,567,524, which is a continuation of U.S. patent application Ser. No. 09/694,880 filed Oct. 24, 2000, now U.S. Pat. No. 6,907,012. The aforementioned related patent applications are herein incorporated by reference.

TECHNICAL FIELD

The present invention relates to a system and method for providing control functionality to communication services, and more particularly, to a method and system for providing communication control functionality at a remotely located site using a distributed feature architecture.

BACKGROUND OF THE INVENTION

In the network architectures currently used for most voice and data communications, such as the Public Switched Telephone Network, intelligence is concentrated at central locations to allow for complicated functions to be implemented on a widespread basis. Network elements which may be utilized to carry out these functions include network databases and Automatic Call Distributors (ACDs). Such functions may include complex routing instructions as may be required in directing calls to call centers with multiple geographic locations and services which use calling cards. In the case of call center services, multiple calls are routed to ACDs at the same time causing the calls to be placed in queues. Typically, ACDs are located on the call center premises and owned and operated by the call center. The expense involved in obtaining and operating the ACDs is significant.

Another phenomenon which is affecting how communication services are being provided is due to the fact that many employees are now able to work out of their homes, commonly referred to as telecommuting. In order for telecommuters to effectively perform their jobs, there is a need for the telecommuter to have access to sophisticated communication services such as company databases and other software, as well as telecommunication features such as conference calling and call forwarding. It is very expensive to provide telecommuters with the equipment required to be able to provide these services.

There is a need to provide telecommuters with the ability to have sophisticated communication control functionality in a cost effective manner. One solution to this problem is to provide the communication control functionality in the network and make it accessible to the telecommuter. Such a solution is described in commonly assigned, co-pending patent application Ser. No. 09/318,015 filed May 25, 1999 entitled "Method and System for Providing Communication Control Functionality at a Remotely Located Site" which is incorporated by reference herein. However, this solution is not contemplated in the context of a distributed feature architecture.

SUMMARY OF THE INVENTION

The present invention is directed to a system and method for providing communication control functionality at a remotely located site using a distributed feature architecture. An Enhanced Network User (ENU) connects to a Distributed Feature Network (DFN) in order to gain access to communications features contained in the DFN. Based on the type of communication requested, one or more feature boxes are created in order to implement the requested communication.

An example of the type of ENU who may request communication over the DFN is a customer service representative or agent who works in a remote location from a call center and does not have access to sophisticated communication equipment. The customer service representative connects to the DFN and logs' in so that he can have access to call center applications. Once logged in, the customer service representative is able to retrieve information, such as order forms and customer records from an operational database. The customer service representative also is able to use sophisticated communication features such as conference calling, transferring calls and monitoring techniques by accessing the appropriate feature boxes in the DFN.

Another example of the type of ENU who may request communication over the DFN is a telecommuter. The telecommuter connects to the DFN and logs in so that he can have access to telecommuter applications. Once logged in the telecommuter is able to retrieve files from an operational database. The telecommuter is also able to use sophisticated communication features such as conferencing, share presentation and other application by accessing the appropriate feature boxes in the DFN.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
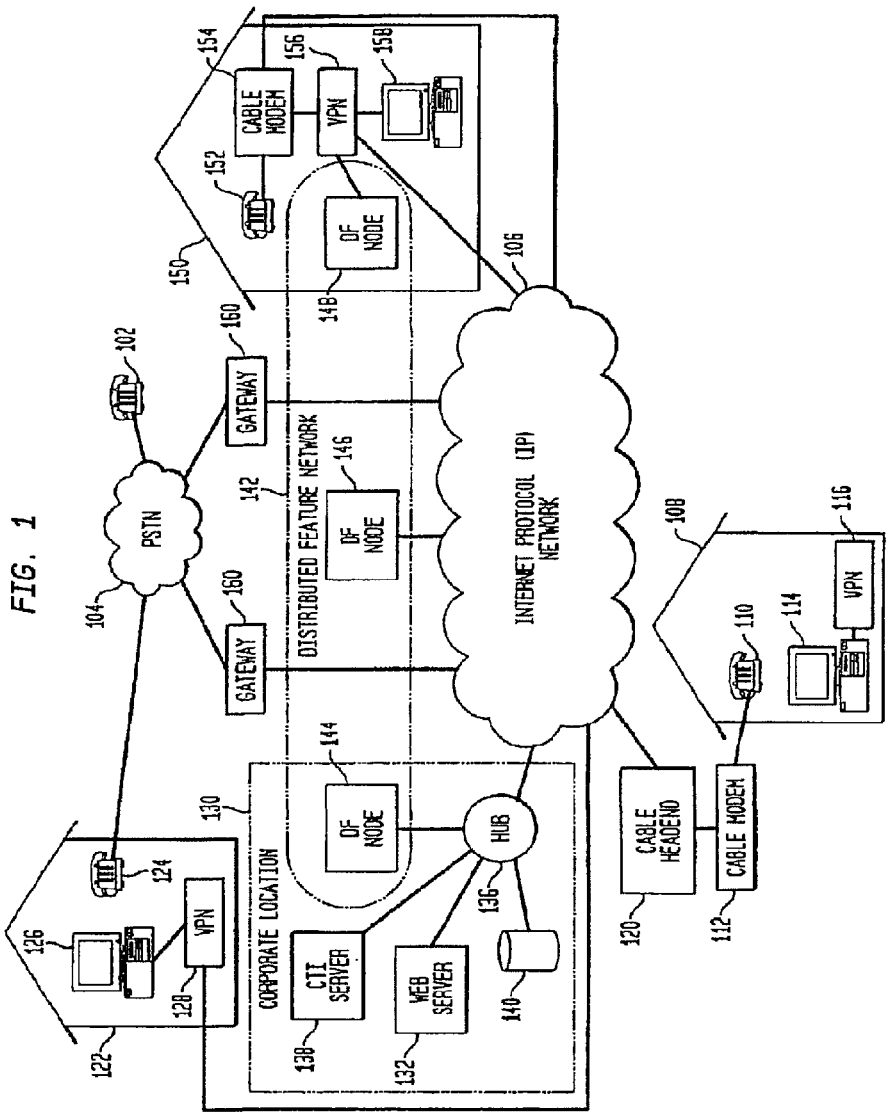
FIG. 1 illustrates a block diagram of a system for implementing communication control functionality at a remotely located site in accordance with the present invention.

FIG. 1 illustrates a system for implementing communication control functionality at a remotely located site using a distributed feature architecture in accordance with the present invention. It is to be understood that the present invention is being described in the context of a user (such as one at location 108, 122 or 150) being able to access network capabilities to be able to perform desired functions at his location without the need for specialized telecommunications equipment or elaborate network connections.

The type of applications which may be employed by the user are of the type which might normally be required in a workplace environment, such as, but not limited to call center software applications or other type of office related applications such as conferencing, access to corporate databases and software and various other applications. In addition, communications between a user of such network capabilities and a third party which does not have access to these capabilities will also be discussed hereafter.

For ease of explanation, a user of the network features contemplated by the present invention will be referred to hereinafter as an enhanced network user (ENU). A third party trying to reach an ENU will be referred to as a third party caller (TPC). The manner in which a TPC or ENU may connect to the network elements is fully described in co-pending application Ser. No. 09/318,015 filed May 25, 1999 entitled "Method and System for Providing Communication Control Functionality at a Remotely Located Site" which, as indicated above, is incorporated by reference herein. The types of communication applications which may be used by the ENU are further described in co-pending application Ser. No. 09/492,594 filed Jan. 27, 2000, entitled "Virtual Contact Center With Flexible Staffing Control"; Ser. No. 09/490,887 filed Jan. 27, 2000, entitled "Control of Merchant Application by System Monitor in Virtual Contact Center"; and Ser. No. 09/370,766 filed Aug. 9, 1999, entitled "Method and System for Providing Enhanced Call Service Features at Remote Locations" each of which is incorporated herein by reference.

An ENU may connect to a distributed feature network 142 in a number of ways. The distributed feature network (DFN) 142 is the mechanism by which the ENU is able to obtain and utilize the enhanced network features the ENU needs to perform his or her desired tasks. The DFN 142 comprises a number of nodes where feature logic resides and executes. These Distributed Feature Nodes (DF Nodes) can be deployed at various locations in the network, such as DF Node 144 in corporate location 130, DF Node 148 in ENU home 150, and a network resident DF Node 146. Each DF Node is comprised of a DFN router, trunk interfaces, feature boxes, a configuration database and an operational database as will be made more apparent hereinafter.

An ENU at a first location 108 accesses the DFN 142 by using either a telephone 110 and/or a personal computer (PC) 114 to connect via a cable modem 112 to a cable headend 120 which is connected to the Internet 106. It to be understood by those skilled in the art that instead of the Internet 106 the ENU could connect to an Intranet or other type of wide area network. The ENU must log in prior to gaining access to the DFN 142.

In addition to logging in to the DFN 142, an ENU may also be required to authenticate their identity. Authentication may occur through any known means. Identifying characteristics that have been employed in authentication techniques include: voice samples, fingerprints, retina patterns, personal appearance, handwriting and even the manner in which a wave is polarized as it passes through a portion of the body. Another method employed to obtain such an alleged identity is to require the requester to enter some type of a code. This code may be typed in via a keypad or scanned from a device in the requester's possession and may comprise a login identification and password or a pseudorandom code generated by a security device. In addition, smart cards or digital certificates can be used to authenticate the ENU.

For example, the ENU may log into the DFN 142 by entering an appropriate login name and password either by typing or speaking the login name and password into the PC 114 or speaking the login name and password into the telephone 110. A web server 132 and database 140 which contain all of the data needed to run the various applications required by the ENU are accessible to the DFN 142 via a hub 136 which is preferably a router.

A two line solution can be used to connect to the DFN 142. An ENU located at house 122 can use a telephone 104 to connect to the Public Switched Telephone Network (PSTN) 104. The PSTN 104 can then connect via a gateway 160 to the Internet 106. The ENU's PC 126 can also connect through a Virtual Private Network (VPN) 128 to the Internet 106. As indicated above, in order for the ENU PC 126 to access the DFN 142 it must first log in. Once logged in, the ENU PC 126 can connect to the corporate web server 132 and database 140 via a hub 136.

An ENU may also directly connect to the DFN 142. A telecommuter located at house 150 may connect to a virtual private network (VPN) 156 via a PC 158 which is directly connected both to the Internet 106 and the DFN 142.

The specifics of how the DFN 142 operates in order to provide various multimedia services is described in co-pending patent application Ser. No. 09/034,681 entitled "Telecommunication System and Method" which was filed on Mar. 4, 1998 and provisional application Ser. No. 60/154,877, filed Sep. 20, 1999, entitled "Routing Extensions for Telecommunications Network System and Method" both of which are incorporated by reference herein. In accordance with the present invention, the distributed feature network can be used to implement communication control functionality to an enhanced network user by providing the functionality via the network rather than by requiring the enhanced network user to have specialized equipment.

Because of the dynamic nature of the DFN in that feature boxes are created and destroyed based on the network functional requirements of a particular ENU, the present invention will be described in conjunction with a number of network diagrams which illustrate various network functionalities which may be required to practice the present invention. It is to be understood by those skilled in the art that these diagrams are merely a sampling of the type of functionality which may be implemented using the present invention, and not an exhaustive catalog of all network functionalities available to any given ENU.

Figure 2:
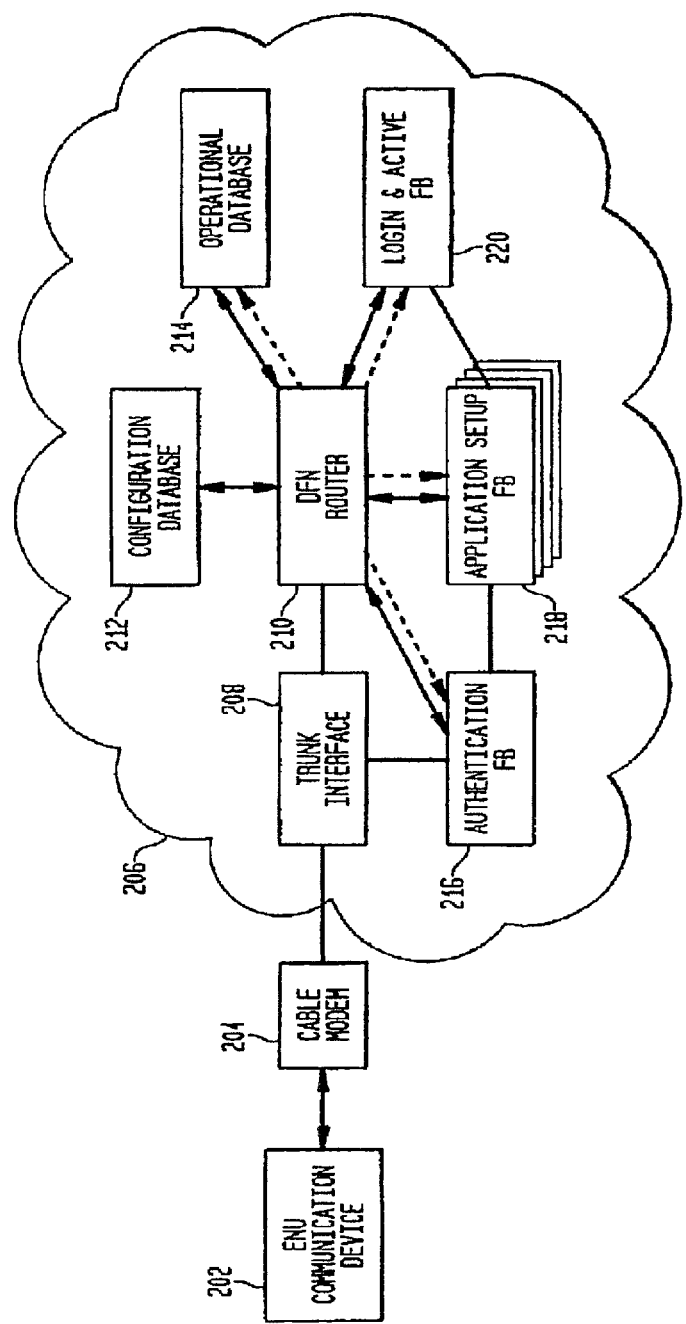
FIG. 2 is a block diagram of the system of FIG. 1 which illustrates how an enhanced network user may log onto a communication network to achieve communication control functionality according to an embodiment of the present invention.

FIG. 2 illustrates an architecture which may be used to have an ENU log onto a DFN 206. The DFN 206 provides the ENU with the data and software required to obtain sophisticated multimedia features such as, but not limited to, conferencing, call forwarding, downloading of databases, spreadsheets and forms, etc. Types of uses for the DFN 206 include call center applications for remote call center workers and office-type applications for telecommuters. DFN 206 may be made up of a number of DF Nodes. Each DF Node is responsible for providing the ENU with a particular communication functionality.

The DFN is comprised of a plurality of feature boxes (e.g., authentication feature box 216). The feature boxes communicate with an operational database 214 for the storage and retrieval of data. For example, a feature box may access TPU records to determine if a TPU's information matches information kept on file for that particular TPU. Another example would be the retrieval of data which represents which ENUs (e.g., call agents) are busy and the size of a queue for a particular ENU. Other data which may be accessed from the operational database 214 includes customer profiles, inventories and various forms.

An example of how an ENU may gain access to the DFN 206 will now be described. An ENU communication device 202, such as a PC, connects to a DFN 206 via a cable modem 204 by dialing an access number. A trunk interface 208 located within the DFN 206 receives the access number and forwards the number to a DFN router 210. The DFN router 210 then looks up the access number in a configuration database 212 to determine which feature box or boxes need to be accessed. The configuration database 212 provides data which pertains to call set up and determines which feature boxes are required to accomplish the call set up and in which order the feature boxes need to be accessed.

In an embodiment of the present invention, the translation of the access number may be used to determine login criteria for the ENU. The IP address of the ENU communication device-may also be received by the DFN router 210. In the present example, the DFN database determines that an ENU associated with the ENU communication device 202 must log in. The authentication feature box (FB) 216 requires that the ENU associated with the ENU communication device 202 provide login information, such as a login name and password.

Assuming that a valid login name and password are received, the authentication FB 216 would compare the login name and password to a table containing valid login names and passwords residing in the operational database 214 to log in the ENU associated with the ENU communication device 202. Once logged in, application FB 218 would be created to allow the ENU associated with the ENU communication device 202 to have access to the operational database 214 as well as additional feature boxes in the DFN 206.

The application FB 218 represents the set of feature boxes that would be set up to allow the ENU communication device 202 to have access to software applications maintained by the operational database 214. The types of application feature boxes which may be required by the ENU include feature boxes for creating order forms, viewing customer records, and for checking inventory stock. In an example where the ENU is a contact center agent who is logging into the contact center to begin receiving calls, a login and activate FB 220 is created to update the status of the ENU in the operational database 214 to indicate that the ENU is available to receive incoming calls.

Figure 3:
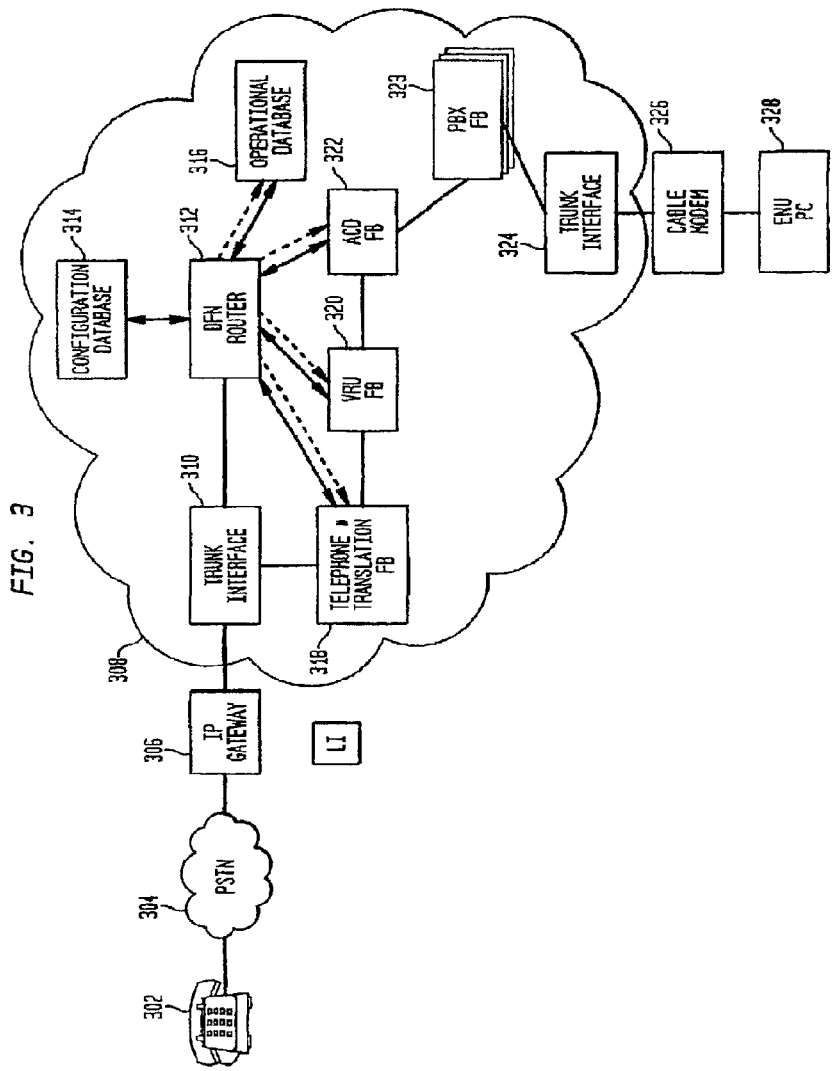
FIG. 3 is a block diagram of the system of FIG. 1 which illustrates how the enhanced network user receives an incoming communication from a third party caller in accordance with the present invention.

FIG. 3 illustrates a system for receiving an incoming call intended for an ENU in accordance with the present invention. A Third Party Caller (TPC) places "a call to an ENU using a telephone 302. It is to be understood by those skilled in the art that the TPC may use another type of communication device such as, but not limited to, a wireless telephone, a computer with telephony software or a personal communication device without departing from the scope and spirit of the present invention. The call is communicated over the Public Switched Telephone Network (PSTN) 304 to an IP gateway 306. In accordance with one embodiment of the present invention, the routing of the call to the IP gateway 306 is the result of the translation of the dialed number inputted into telephone 302 by the caller by a network database (not shown) located within the PSTN 304. The translation would indicate the routing instructions which would include routing to the IP gateway 306. The dialed number may be a toll free number such as an 8## number or any other type of telephone number which would be recognized by the PSTN 304 as requiring translation for routing purposes.

The IP gateway 306 would then route the call to a trunk interface 310 which is located within the DFN 308. The DFN 308 is preferably a packet-based network such as the Internet or an intranet. The trunk interface 310 would then route the call to a DFN router 312. Included with the call may be the dialed number (DNIS) as well as the number from which the called originated (ANI). Other information to the extent it may affect further routing of the call such as, but not limited to, time of day, day of week, geographic area of origination may also be communicated with the call.

The DFN router 312 would then communicate with the configuration database 314 to determine what features need to be created to handle the incoming call. For each feature that is required, a feature box is created. In the present example being described in conjunction with FIG. 3. It is assumed that the TPC is attempting to reach a call center representative, in the present example ENU PC 328.

The trunk interface 310 would first route the call and the additional information mentioned above to a Telephone Number Translation (TNT) feature box 318. The TNT feature box 318 would then communicate with the operational database 316 via the DFN router 312 to perform a lookup of the configuration database 314 and then determine further routing instructions for the call. In the present example, the telephone number translation indicates that the call is directed to a call center representative. Based on various factors such as, but not limited to, where the call originates (e.g., ANI), the time of day and day of week, an initial determination of specifically where the call should be routed is determined.

Next the configuration database 314 has determined that a Voice Response Unit (VRU) feature box 320 is needed to get further information from the TPC. A connection is established between the VRU feature box 320 and the TPC's telephone 302 to obtain specific information from the TPC. Such information may include the purpose of the call (e.g., to place an order, register a complaint, speak with customer service), or the urgency of the call. The TPC may provide the requested information in any of a number of conventional ways for responding to a VRU including Dual Tone Multi-frequency (DTMF) tones or voice response. Based on the information provided by the TPC which is then forwarded to the operational database 316, the ultimate destination of the call may be altered.

Once the final routing for the call has been determined by the configuration database 314, the call is forwarded to an Automatic Call Distributor (ACD) feature box 322 which will connect the TPC to the designated ENU PC 328, when the ENU PC 328 is available to receive the call. As with any ACD, if there are more callers than call center representatives to answer the calls, queues will be formed for one or more of the call center representatives to manage the call flow. The ACD feature box 322 can also redistribute calls if it determines that calls can be handled in a more expedited fashion. The ACD feature box 322 may also communicate with one or more PBX feature boxes 323. The PBX feature boxes 323 provide features which are similar to a conventional PBX such as, but not limited to, hold, conferencing, and transfer. Once the ENU PC 328 is available to take the call from the TPC, a trunk interface 324 communicates the call to the ENU PC 328 via a cable modem 326.

Figure 4:
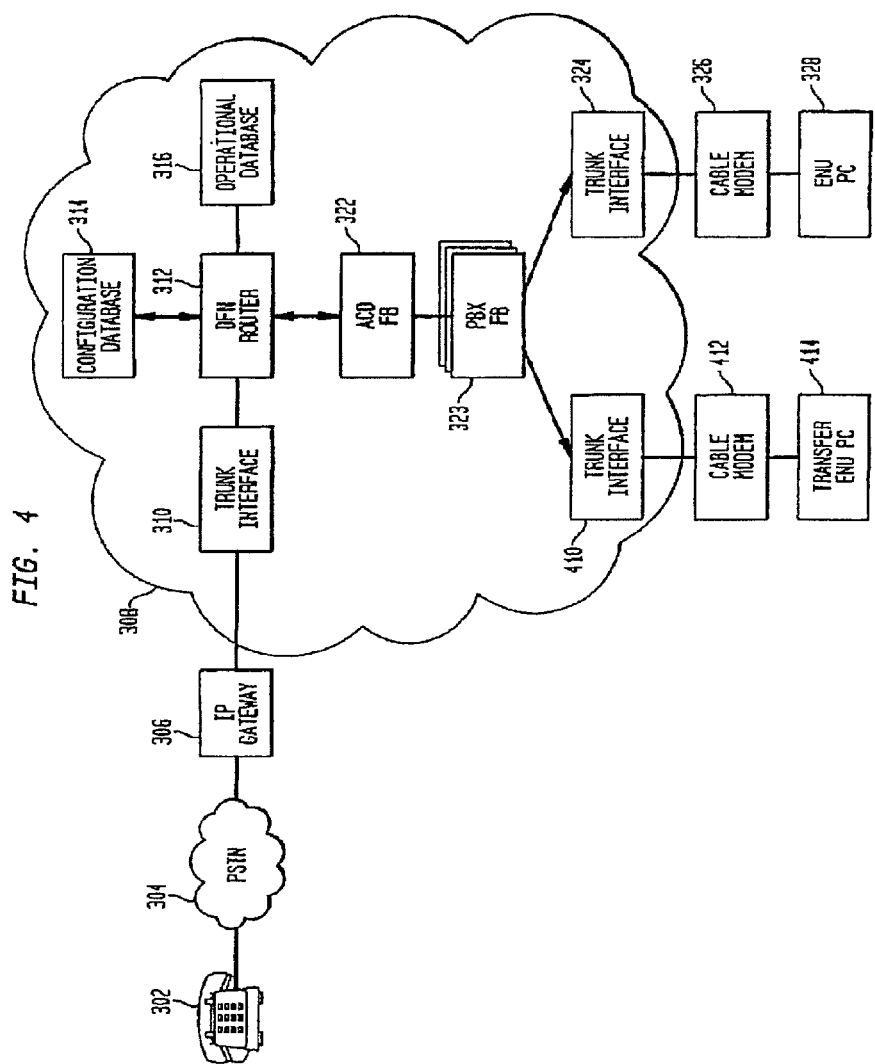
FIG. 4 is a block diagram of the system of FIG. 1 which illustrates how the enhanced network user may take advantage of communication control functionality resident in the network during the handling of a call with a third party caller in accordance with the present invention.

Another aspect of the present invention is the ability for the ENU to have access to communication control functionality through the communication network. An example of such functionality will be described now with reference to FIG. 4. Continuing the example illustrated in FIG. 3, it is determined by the ENU that the call from the TPC needs to be transferred to another call center representative (ENU). The ENU sends a message to the PBX feature box 323 via the ENU PC 328 indicating that the call needs to be transferred to another agent. It is to be understood that the agent in which the call is to be transferred may be specified or the call may generally be rerouted to another location. In the present example, it is being assumed that the call is being routed to a specific agent. As such, included in the message to the PBX feature box 323 is an indication of which agent should receive the call.

The PBX feature box 323 forwards a request to the DFN router 312 to receive the address of the agent to which the call should be routed. The DFN router 312 sends a query to the operational database 316 to retrieve the address. The operational database 316 includes a table of agents and their corresponding address locations. The appropriate address is retrieved and sent to the PBX feature box 323 via the DFN router 312. The PBX feature box 323 then determines if the agent is available to take the call. If the agent is available, the PBX feature box 323 transmits the call to a router 410 associated with the agent's PC 414. The call is then bridged from the ACD feature box 322 to the transfer agent's PC 414. If the agent is unavailable to take the call, the PBX feature box 323 may place the call on hold until the agent is available to take the call.

If the agent at ENU PC 328 requests a transfer to a particular agent group (e.g. technical support agent transferring the call to sales), then the ACD feature box 322 is responsible to queue the call to the group. As such, the ENU sends a message via the ENU PC 328 indicating that the call needs to be transferred to a particular agent group.

The ACD feature box 322 forwards a request to the DFN router 312 to receive the address of the agent group to which the call should be routed. The DFN router 312 sends a query to the operational database 316 to retrieve the address. The operational database 316 includes a table of agents groups and their corresponding address locations. The appropriate address is retrieved and sent to the ACD feature box 322 via the DFN router 312. The ACD feature box 322 then determines if one of the agents in the particular agent group is available to take the call. If the agent is available, the ACD feature box 322 transmits the call to a router 410 associated with the agent's PC 414. The call is then bridged from the ACD feature box 322 to the transfer agent's PC 414. If the agent is unavailable to take the call, the ACD feature box 322 may transfer the call to the PBX feature boxes 323 which may place the call on hold until the agent is available to take the call or the call may be placed in a queue to be answered by the agent when he or she is available.

Other types of call control functionality are available to the ENU via the network. Such functionality includes conference calling, placing calls on hold, and accessing remote computer databases and software applications. In the case of call center applications, such software applications can be used to place orders, provide customer service assistance and access inventory databases. For each action which is to be carried out by the ENU, one or more feature boxes are set up within the network 308.

Figure 5:
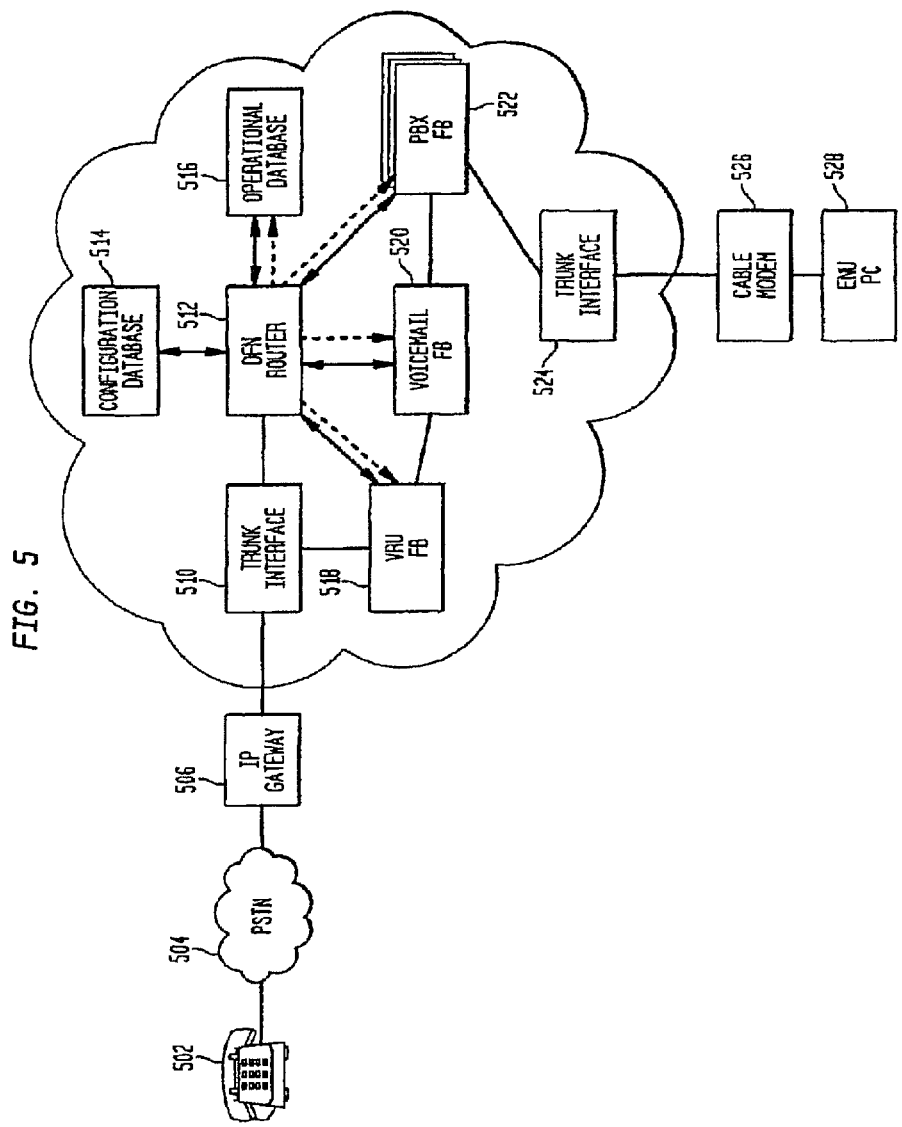
FIG. 5 is a block diagram of the system of FIG. 1 which illustrates how the enhanced network user may take advantage of communication control functionality resident in the network in a telecommuting context in accordance with the present invention.

It is also contemplated that the present invention can be used to carry out telecommuting communication functions. An example of such functionality will now be described with respect to FIG. 5. A TPC calling from a telephone 502 is trying to reach a telecommuter working at ENU PC 528. The TPC dials the telephone number for the ENU which is received by the PSTN 504. It is to be understood by those skilled in the art that the TPC may use another type of communication device such as, but not limited to, a wireless telephone, a computer with telephony software or a personal communication device without departing from the scope and spirit of the present invention. The call is communicated over the Public Switched Telephone Network (PSTN) 504 to an IP gateway 506. The IP gateway 506 then routes the call to a trunk interface 510 which is located within the DFN 508.

The trunk interface 510 would then route the call to a DFN router 512. Included with the call may be the number from which the called originated (ANI). The DFN router 512 would then communicate with the configuration database 514 to determine what features need to be created to handle the incoming call. For each feature that is required, a feature box is created.

Next the configuration database 514 has determined that a Voice Response Unit (VRU) feature box 518 is needed to get further information from the TPC. A connection is established between the VRU feature box 518 and the TPC's telephone 502 to obtain specific information from the TPC. Such information may include the purpose of the call, or the urgency of the call. The TPC may provide the requested information in any of a number of conventional ways for responding to a VRU including Dual Tone Multifrequency (DTMF) tones or voice response.

The ENU, through some customization interface, is provided with customized information on how an incoming call of a particular purpose or urgency should be handled, (e.g., customer service versus customer order information). This customized information is stored in the operational database 516. Therefore, based on the information provided by the TPC and the information retrieved from the operational database 516, the VRU FB 518 can determine the ultimate destination of the call.

In this example, the call is to be presented to the ENU at ENU PC 528. The DFN router 512, based on information in the configuration database 514, has determined that a voice mail FB 520 and additional PBX FBs 522 are required. Finally, the call is connected to the Trunk Interface 524 which communicates the call to the ENU PC 528 via a cable modem 526. If the ENU is busy or not available to take the call, then the voice mail FB 520 will be activated to take a message from the TPU.

While the present invention has been described in connection with the illustrated embodiments, it will be appreciated and understood that modifications may be made without departing from the true spirit and scope of the invention. For example, while the present invention is described with reference to call center applications. It can be appreciated that the present invention may be used in any situation in which a user is working remotely from a centralized workplace. Examples of such users are telecommuters and remote schooling programs. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

The invention claimed is:
1. A method, comprising:
  creating, via a hub deployed in a distributed feature network, an authentication feature box for receiving login information from a communication device, the authentication feature box determining whether the communication device is authorized to have access to a communication control functionality, wherein the communication control functionality is residing in the distributed feature network; and upon login, creating dynamically via the hub an application feature box when the application feature box is determined to be needed, wherein the application feature box is created in the distributed feature network and is operating within the distributed feature network, wherein the application feature box is created for performing at least one of: performing the communication control functionality for the communication device, downloading a data record from an operational database, or communicating the data record to the communication device, wherein the performing the communication control functionality comprises performing at least one of: processing a voice communication, processing a data communication, processing a multimedia communication, providing a transfer capability, or providing a conferencing capability.

2. The method of claim 1, further comprising:
allowing the communication device via a signaling channel to access the application feature box.

3. The method of claim 1, further comprising:
allowing the communication device via a media channel to access the application feature box.

4. The method of claim 1, further comprising:
allowing the communication device via a signaling channel to access the data record in the operational database.

5. The method of claim 1, further comprising:
allowing the communication device via a media channel to access the data record in the operational database.

6. The method of claim 1, further comprising:
receiving an incoming call intended for the communication device; and
creating a feature box for connecting the incoming call to the communication device.

7. The method of claim 6, further comprising:
receiving a communication from the communication device requesting that the incoming call be transferred to voice mail;
creating a feature box for receiving a voice mail message; and
transferring the incoming call to the feature box for receiving the voice mail message.

8. The method of claim 6, further comprising:
receiving a communication from the communication device requesting that the incoming call be transferred to another communication device;
creating a feature box for transferring the incoming call; and
transferring the incoming call to the another communication device.

9. The method of claim 6, further comprising:
forwarding the data record from the operational database to the communication device, the data record containing at least one of: information pertaining to the incoming call, customer record information relating to a customer associated with the incoming call, and at least one order form.

10. The method of claim 1, wherein the distributed feature network comprises at least one of: a broadband network, and a cable network.

11. The method of claim 1, wherein the communication device is a computer.

12. A system, comprising:
a hub deployed in a distributed feature network for:
creating an authentication feature box for receiving login information from at least one communication device, the authentication feature box determining whether the at least one communication device is authorized to have access to a communication control functionality, wherein the communication control functionality is residing in the distributed feature network; and
creating dynamically an application feature box when the application feature box is determined to be needed, wherein the application feature box is created in the distributed feature network and is operating within the distributed feature network, wherein the application feature box is created for performing at least one of: performing the communication control functionality for the at least one communication device, downloading a data record from an operational database and communicating the data record to the at least one communication device, wherein the performing the communication control functionality comprises performing at least one of: processing a voice communication, processing a data communication, processing a multimedia communication, providing a transfer capability, or providing a conferencing capability.

13. The system of claim 12, further comprising:
allowing the at least one communication device via a signaling channel to access the application feature box, or the data record in the operational database.

14. The system of claim 12, further comprising:
allowing the at least one communication device via a media channel to access the application feature box, or the data record in the operational database.

15. The system of claim 12, further comprising:
receiving an incoming call intended for the at least one communication device; and
creating a feature box for connecting the incoming call to the at least one communication device.

16. The system of claim 15, further comprising:
receiving a communication from the at least one communication device requesting that the incoming call be transferred to voice mail;
creating a feature box for receiving a voice mail message; and
transferring the incoming call to the feature box for receiving the voice mail message.

17. The system of claim 15, further comprising:
receiving a communication from the at least one communication device requesting that the incoming call be transferred to another communication device;
creating a feature box for transferring the incoming call; and
transferring the incoming call to the another communication device.

18. A method, comprising:
receiving, via a hub deployed in a distributed feature network, a communication request from a third party device to connect to a communication device logged onto the distributed feature network;
determining, via the hub, a type of communication requested by the third party device;
determining, via the hub, whether the communication device is available and is able to respond to the type of communication being requested by the third party device;

routing, via the hub, the communication request to the communication device when the communication device is determined to be available and is able to respond to the type of communication being requested; and creating, via the hub, a feature box corresponding to a communication control functionality required by the communication device that is available so that the communication device is able to interact with the third party device, wherein the communication control functionality comprises at least one of: processing a voice communication, processing a data communication, processing a multimedia communication, providing a transfer capability, or providing a conferencing capability, wherein the feature box is created dynamically when the feature box is determined to be needed in the distributed feature network and is operating within the distributed feature network.

19. The method of claim 18, further comprising:

forwarding to the communication device that is available information from an operational database associated with the third party device that originated the communication request.

20. The method of claim 18, wherein the communication request comprises at least one of: a telephone number, or a universal resource locator address.

* * * * *